Dec. 15, 1942.  J. DICKSON  2,304,891
PISTON
Filed Feb. 4, 1941  3 Sheets-Sheet 1

Inventor
John Dickson
By Blackmor, Spencer & Flint
Attorneys

Dec. 15, 1942.   J. DICKSON   2,304,891
PISTON
Filed Feb. 4, 1941   3 Sheets-Sheet 2

Inventor
John Dickson
By Blackmore, Spencer & Flint
Attorneys

Dec. 15, 1942.                J. DICKSON                2,304,891
                                PISTON
        Filed Feb. 4, 1941                    3 Sheets-Sheet 3

Inventor
John Dickson
By
Blackmore, Spencer & Flint
                              Attorneys Patented Dec. 15, 1942

2,304,891

UNITED STATES PATENT OFFICE 2,304,891

PISTON

John Dickson, Ferndale, Mich., assignor to General Motors Corporation, Detroit, Mich., a corporation of Delaware Application February 4, 1941, Serial No. 377,360

6 Claims. (Cl. 123—176)

This invention relates to pistons, and especially to strong but light pistons for two cycle internal combustion engines.

In modern high speed two cycle engines, the conditions under which the pistons have to operate are particularly severe. As compared with a four cycle engine, there are twice the number of power strokes in a given time, at a given speed, and hence, other things being equal, there is considerably more heat to be dissipated through the parts.

Since there is no suction stroke in a two cycle engine, the gas pressure loads on the piston (of a single acting engine) are always in the same direction, and only at higher speeds are they exceeded by inertia forces in an opposite direction. For this reason the bearing between the piston and its connecting rod is mainly subjected to a load in one direction, and that a compression load on the connecting rod. If therefore an adequate bearing to transmit the load in this direction is provided, it is only necessary to provide keeper pieces with a much smaller bearing area to take any inertia loads in an opposite direction and to secure the piston to the connecting rod.

The general object of the invention is an improved piston capable of withstanding high loads and onerous temperature conditions.

A more specific object of the invention is a symmetrical piston structure especially suited for a two cycle engine, in which the bearing for the connecting rod is subtended directly from the crown of the piston by a strut forming an inner circular wall spaced from the skirt of the piston.

Another object of the invention is a piston in which the strut is not subjected to direct bending stresses from the direct load on the piston, in which expansion of the piston crown can take place without unduly high bending stresses in the strut, and longitudinal differential expansion between the strut and the skirt is freely permitted.

Another object of the invention is to achieve the foregoing objects with a piston structure in which side loads due to obliquity of the connecting rod are directly transmitted to the piston skirt.

A still further object of the invention is a piston structure in which the conventional piston pin and piston pin bosses are eliminated.

The above and other objects of the invention will be apparent as the description proceeds.

Figure 1:
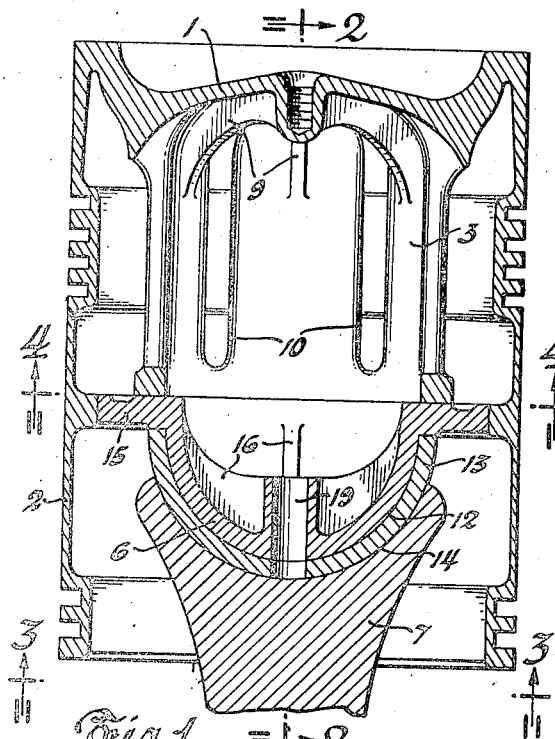
Fig. 1 is a sectional view of a preferred form of construction of a piston for a two cycle engine, according to the invention.
Figure 2:
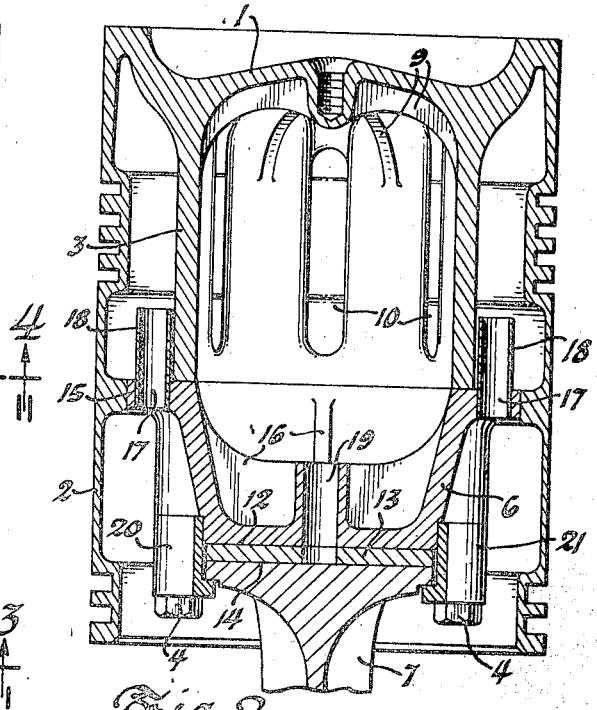
Fig. 2 is a sectional view on line 2—2 of Fig. 1.
Figure 3:
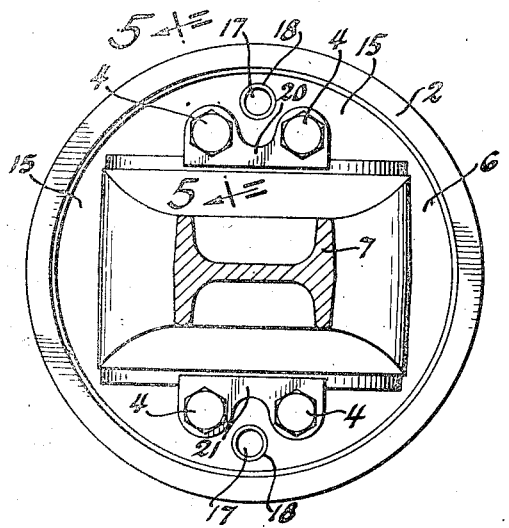
Fig. 3 is a view on line 3—3 of Fig. 1.
Figure 4:
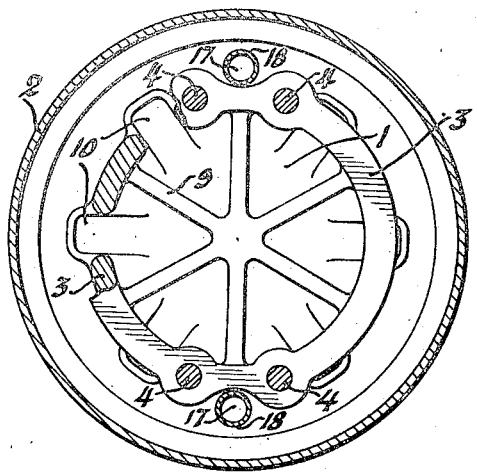
Fig. 4 is a view on line 4—4 of Fig. 1 with part broken away.
Figure 5:
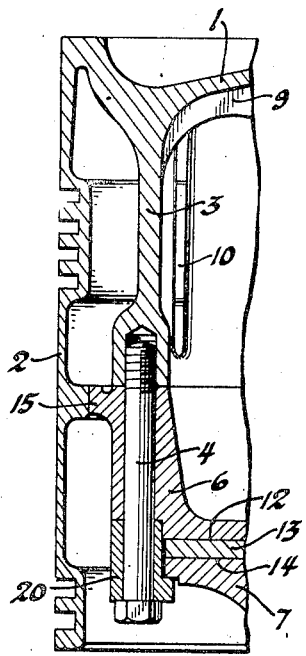
Fig. 5 is a view on line 5—5 of Fig. 3.

In Figs. 1 to 5, the piston includes a crown 1, a skirt 2, and a strut 3, formed as a single malleable casting. Fastened by bolts 4 to the strut 3, is a bearing piece 6, for a connecting rod 7.

The strut 3 is cylindrical, and forms an inner circular wall spaced from the skirt, and it is connected to the crown with arched strengthening ribs such as 9. It is slotted with elongated holes such as 10 parallel to its axis, and thereby constitutes a plurality of load supporting columns capable of bending to permit expansion of the crown relatively to the strut without unduly high bending stresses in the latter, and it has a mean diameter two-thirds that of the piston diameter so that it is at the center of pressure of the load on the piston, to minimize bending stresses in the crown.

Because the strut is cylindrical and not conical, the direct load on the piston causes no direct bending stresses on the strut.

The bearing piece 6 has a convex semi-cylindrical bearing surface 12, with a bronze lining 13 to cooperate with a concave arcuate bearing surface 14 on the connecting rod 7, and has a circular flange portion 15 with a cylindrical surface which is a sliding fit in the skirt, and through which side loads due to obliquity of the connecting rod can be transmitted directly between the skirt and the bearing piece, while longitudinal differential expansion between the strut and the skirt is freely permitted. There are four radial strengthening ribs such as 16 for the bearing piece 6.

At the same time, the flange portion 15 forms a closure for a cooling chamber including the annular space between the skirt and the strut, and the space to the interior of the latter; there being holes 17 provided with tubular extensions 18, through the circular flange portion 15, through which lubricating oil may be projected to cool the piston, and to lubricate the connecting rod bearing through a hole 19 extending through the bearing piece 6 and its bronze lining 13. The tubular extensions 18 maintain a reservoir of lubricating oil in the cooling chamber.

The bolts 4 which hold the bearing piece 6 to the strut 3, extend also through keeper pieces 20 and 21, which take any inertia loads in an opposite direction to the gas pressure loads and secure the piston and connecting rod together. This is desirable in the event of partial seizure of the piston skirt and cylinder liner and also to enable the piston to be withdrawn with the rod.

Figure 6:
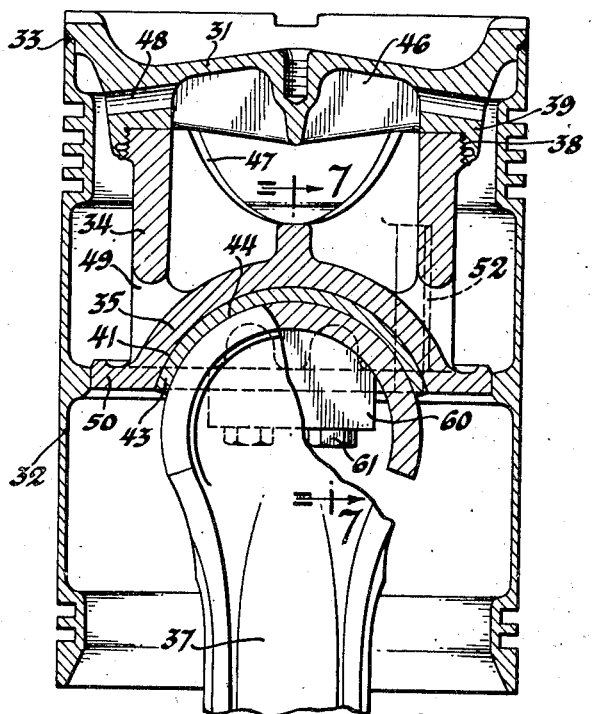
Fig. 6 is a sectional view of a modified form of construction of a piston according to the invention.
Figure 7:
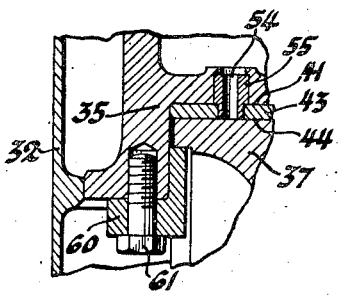
Fig. 7 is a sectional view on line 7—7 of Fig. 6.
Figure 9:
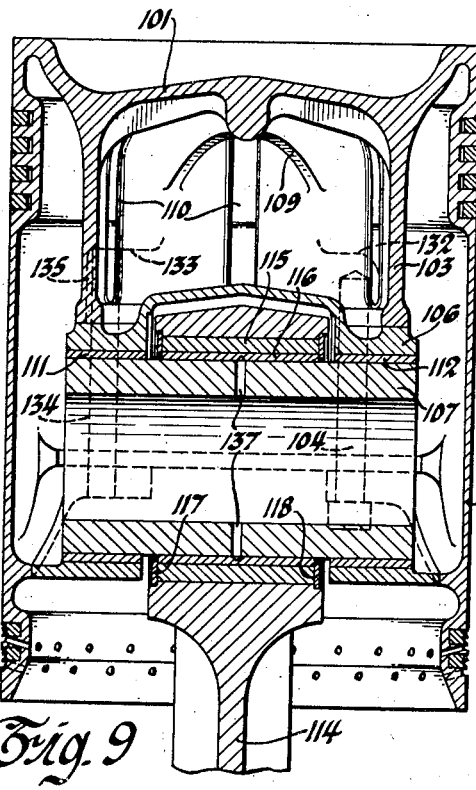
Fig. 9 is a sectional view of a modified form of construction of a piston according to the invention, for use with a connecting rod having a conventional piston pin bearing.
Figure 10:
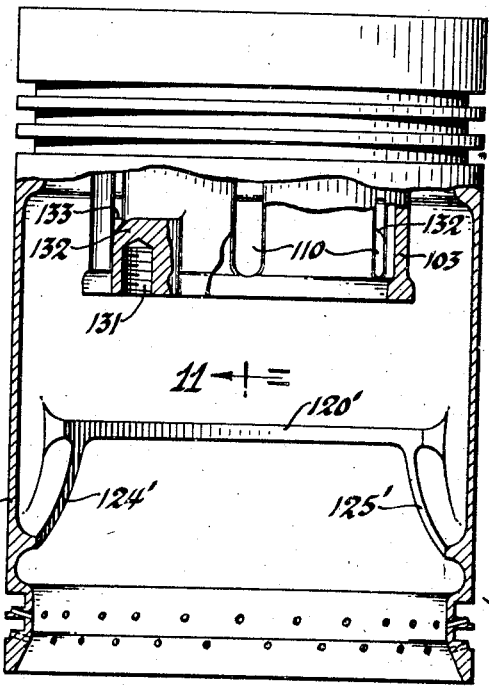
Fig. 10 is a sectional view of parts of the piston in separated relationship with parts broken away.
Figure 11:
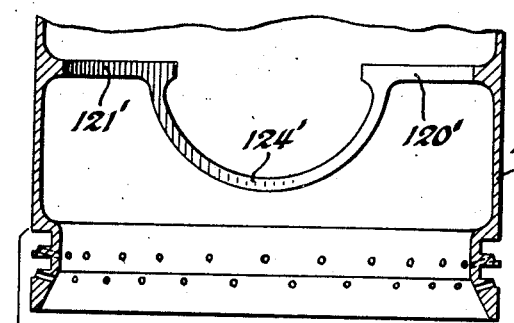
Fig. 11 is a sectional view on line 11—11 of Fig. 10.
Figure 11:
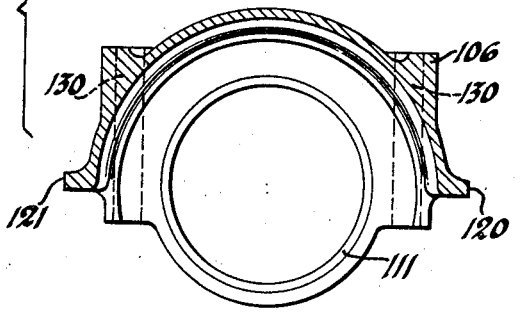
Figure 12:
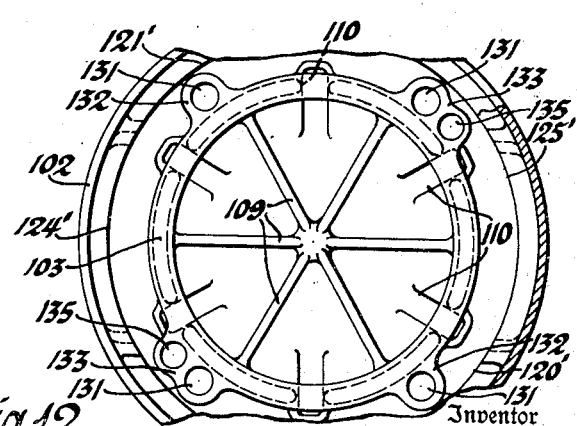
Fig. 12 is a plan view of the piston as seen from the underside.

In the modification shown in Figs. 6 and 7, the piston crown 31 and the skirt 32 are formed separately, and welded together at 33, the strut part 34 and the bearing part 35 for the connecting rod 37, being formed in one piece having a male threaded connection at 38, with a female threaded part 39 of the crown 31.

The strut part 34 is cylindrical and is integral with the bearing part 35, which has a concave semi-cylindrical bearing surface 41 with a bronze lining 43, to cooperate with a convex arcuate bearing surface 44 on the connecting rod 37.

The crown 31 is strengthened by six radial ribs such as 46, while there are four radial strengthening ribs such as 47 for the strut 34.

There are twelve holes such as 48 through the part 39 of the crown 31, and four slotted holes such as 49 through the strut 34.

The bearing part 35 has a circular flange portion 50 with a cylindrical surface which is a sliding fit in the skirt, and through which side loads due to obliquity of the connecting rod can be transmitted directly between the skirt and the bearing part 35, while longitudinal differential expansion between the parts 34 and 35 and the skirt 32 is freely permitted.

At the same time, the flange portion 50 forms a closure for a cooling chamber including the annular space between the skirt and the strut, and the space to the interior of the latter; there being a hole 52 through a thickened portion of the circular flange portion 50, through which lubricating oil may be projected to cool the piston, and to lubricate the connecting rod bearing through holes such as 54 extending through dowel pins such as 55, by which the bronze lining 43 is prevented from turning relatively to the surface 41 of the part 35.

It will be appreciated that a reservoir of lubricating oil, level with the top of the hole 52, is maintained in the cooling chamber.

A pair of keeper pieces such as 60, secured to the part 35 by bolts 61, perform the function of the keeper pieces 20 and 21 of Figs. 1 to 5.

Figure 8:
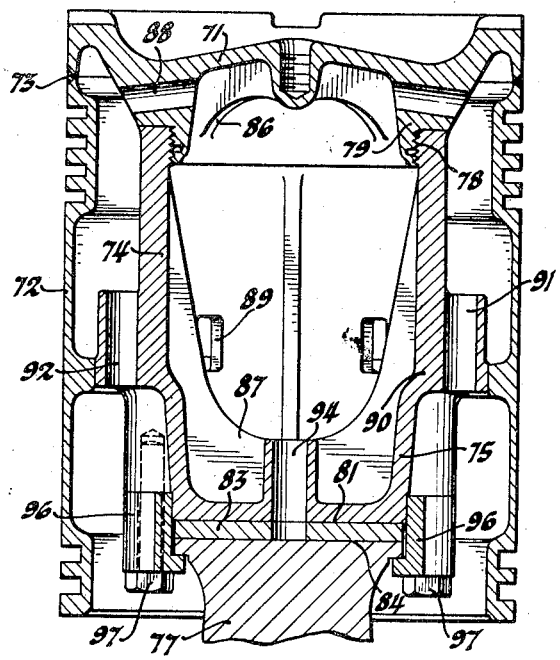
Fig. 8 is a sectional view of another modified form of construction of a piston according to the invention.

In the modification shown in Fig. 8, the piston crown 71 and the skirt 72 are formed separately, and welded together at 73, the strut part 74 and the bearing part 75 for the connecting rod 77, being formed in one piece having a female threaded connection at 78, with a male threaded part 79 of the crown 71.

The strut part 74 is cylindrical and is integral with the bearing part 75, which has a convex semi-cylindrical bearing surface 81 with a bronze lining 83, to cooperate with a concave arcuate bearing surface 84 on the connecting rod 77.

The crown 71 is strengthened by six radial ribs such as 86, while there are four radial strengthening ribs such as 87 for the strut 74.

There are twelve holes such as 88 through the part 79 of the crown 71, and four slotted holes such as 89 through the strut 74.

At the juncture of the parts 74 and 75, there is a circular flange 90 with a cylindrical surface which is a sliding fit in the skirt, and through which side loads due to obliquity of the connecting rod can be transmitted directly between the skirt and the bearing part 75, while longitudinal differential expansion between the parts 74 and 75 and the skirt 72 is freely permitted.

At the same time, the flange portion 90 forms a closure for a cooling chamber including the annular space between the skirt and the strut, and the space to the interior of the latter; there being holes 91 and 92 through thickened portions of the flange 90, through which lubricating oil may be projected to cool the piston, and to lubricate the connecting rod bearing through a hole 94 extending through the bearing part 75 and its bronze lining 83.

A reservoir of lubricating oil, level with the top of the holes 91 and 92 is maintained in the cooling chamber.

A pair of keeper pieces such as 96, secured to the part 75 by bolts 97, take any inertia loads in an opposite direction to the gas pressure loads and secure the piston and connecting rod together.

In the modification shown in Figs. 9 to 12, the piston includes a crown 101, a skirt 102, and a strut 103, formed as a single casting. Fastened by four bolts such as 104 to the strut 103, is a bearing piece 106, for a piston pin 107.

The strut 103 is cylindrical, forms an inner circular wall spaced from the skirt, and is connected to the crown by arched strengthening ribs such as 109. It is slotted with elongated holes such as 110 parallel to its axis, and thereby constitutes a plurality of load supporting columns capable of bending to permit expansion of the crown relatively to the strut without unduly high bending stresses in the latter, and it has a mean diameter two-thirds that of the piston diameter so that it is at the center of pressure of the load on the piston, to minimize bending stresses in the crown.

The bearing piece 106 is bored for two coaxial bronze bushings 111 and 112, in which opposite ends of the tubular piston pin 107 are supported. The eye of the connecting rod 114 is bored for a sleeve 115, within which is a bronze bushing 116. The sleeve with its bushing is retained in the eye of the connecting rod by two steel rings 117 and 118, and constitutes the bearing for the connecting rod on the piston pin 107, intermediate of the bushings 111 and 112.

The bearing piece 106 has a cylindrical outer periphery which is a sliding fit in a bored portion of the piston skirt below the strut 103. As shown most clearly in Figs. 10 and 11, the elevational contour of the cylindrical surface of the bearing piece 106, which has sliding contact with the bore of the piston skirt, is made up of two opposite surfaces on flange portions 120 and 121 in a plane normal to the axis of the piston and containing the axis of the piston pin 107, and two opposite semi-circular surfaces on flange portions 124 and 125 which curve below the plane of the flange portions 124 and 125. The corresponding surfaces in the bore of the piston skirt are 120', 121', 124', and 125' respectively.

There are four holes such as 130 through the bearing piece 106 for the bolts such as 104 which are screwed into four corresponding tapped holes 131 in suitable lug portions 132 and 133 of the strut 103, to secure the bearing piece to the strut. Side loads due to obliquity of the connecting rod are transmitted directly between the skirt and the bearing piece through the sliding cylindrical surfaces of the flange portions 120', 121', 124', 125', and 120, 121, 124, 125, while longitudinal differential expansion between the strut with the bearing piece, and the skirt, is freely permitted.

At the same time, the flange on the bearing piece forms a closure for a cooling chamber including the annular space between the skirt and the strut, and the space to the interior of the latter; there being two holes 134 through the bearing piece, with extensions 135 through the lugs 133 of the strut, through which lubricating oil may be projected to cool the piston. It will be noted that the bore of the tubular piston pin 107 is open at its ends to the annular space extending between the skirt and the strut, and that a reservoir of lubricating oil will be maintained therein. Lubricating oil is carried to the bushing 116 from the interior of the piston pin through holes 137.

In all the illustrated modifications according to the invention the crown is free to expand without overstressing the load carrying strut and the ring belt and piston skirt which are free from gas pressure loading are uniform in thickness and present unbroken surfaces to the cylinder wall.

I claim:

1. A piston including a crown, a skirt, and a bearing piece with a bearing for a connecting rod subtended from the crown by a strut forming an inner circular wall spaced from the skirt and unconnected thereto, said bearing piece having a cylindrical surface which is a sliding fit in the skirt, whereby longitudinal differential expansion between the strut and the skirt is freely permitted, while side thrust forces due to obliquity of the connecting rod are directly transmitted to the piston skirt through said sliding cylindrical surface.

2. The combination according to claim 1, in which there are holes through the inner circular wall formed by the strut, and the cylindrical surface of the bearing piece forms a closure for a cooling chamber including the annular space between the skirt and the strut and the space to the interior of the latter; there being a hole through the bearing piece through which lubricating oil may be projected, to cool the piston.

3. The combination according to claim 1, in which there are holes through the inner circular wall formed by the strut, and the cylindrical surface of the bearing piece forms a closure for a cooling chamber including the annular space between the skirt and the strut and the space to the interior of the latter; there being a hole through the bearing piece through which lubricating oil may be projected, to cool the piston, and to lubricate the surface of the bearing through a hole in the bearing piece from the cooling chamber to the surface of the bearing.

4. The combination according to claim 1, in which the strut is cylindrical, has a mean diameter two-thirds that of the piston diameter, and is slotted parallel with its axis.

5. A piston including a crown, a skirt, and a bearing piece with a bearing for a connecting rod, subtended from the crown by a slotted cylindrical strut concentric with but spaced from and unconnected to the piston skirt; said slotted cylindrical strut constituting a plurality of load supporting columns disposed in a circle, and capable of bending to permit expansion of the crown.

6. The combination according to claim 5, in which the circle of load supporting columns forming a slotted cylindrical strut has a mean diameter two-thirds that of the piston diameter.

JOHN DICKSON.